(12) United States Patent
Konzelmann et al.

(10) Patent No.: US 7,987,732 B2
(45) Date of Patent: *Aug. 2, 2011

(54) ULTRASONIC MEASURING UNIT HAVING INTEGRATED HUMIDITY ANALYSIS

(75) Inventors: Uwe Konzelmann, Asperg (DE); Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

This patent is subject to a terminal disclaimer.

(21) Appl. No.: 11/990,572

(22) PCT Filed: Jun. 1, 2006

(86) PCT No.: PCT/EP2006/062828
§ 371 (c)(1),
(2), (4) Date: Mar. 24, 2009

(87) PCT Pub. No.: WO2007/020113
PCT Pub. Date: Feb. 22, 2007

(65) Prior Publication Data
US 2009/0178490 A1      Jul. 16, 2009

(30) Foreign Application Priority Data

Aug. 16, 2005   (DE) .................. 10 2005 038 599

(51) Int. Cl.
*G01F 1/66* (2006.01)
(52) U.S. Cl. .................. 73/861.29; 73/861.25
(58) Field of Classification Search .......... None
See application file for complete search history.

(56) References Cited

U.S. PATENT DOCUMENTS

| | | | | |
|---|---|---|---|---|
| 4,663,977 | A | * | 5/1987 | Vander Heyden ......... 73/861.27 |
| 5,440,937 | A | | 8/1995 | Lynnworth et al. |
| 5,583,301 | A | * | 12/1996 | Strauss et al. ............. 73/861.29 |
| 5,777,892 | A | * | 7/1998 | Nabity et al. ................ 702/143 |
| 6,732,595 | B2 | * | 5/2004 | Lynnworth ............... 73/861.27 |
| 7,093,502 | B2 | * | 8/2006 | Kupnik et al. ............ 73/861.29 |
| 2004/0060345 | A1 | * | 4/2004 | Eggen et al. ................. 73/54.41 |
| 2005/0066744 | A1 | * | 3/2005 | Kupnik et al. ............ 73/861.03 |
| 2006/0156828 | A1 | * | 7/2006 | Konzelmann et al. ..... 73/861.25 |
| 2008/0271543 | A1 | * | 11/2008 | Hecht et al. ............... 73/861.27 |

FOREIGN PATENT DOCUMENTS

| | | |
|---|---|---|
| DE | 42 37 907 | 5/1994 |
| DE | 44 42 078 | 5/1996 |
| DE | 197 13 526 | 10/1998 |
| EP | 0 477 418 | 4/1992 |
| EP | 1 094 305 | 4/2001 |

* cited by examiner

*Primary Examiner* — Harshad Patel
(74) *Attorney, Agent, or Firm* — Kenyon & Kenyon LLP

(57) ABSTRACT

An ultrasonic measuring unit and a method for detecting ultrasonic signal run-times, in which the ultrasonic measuring unit has two ultrasonic transducers for coupling ultrasonic signals into a flowing medium. Analysis electronics are provided to be accommodated on or in a flow tube, in which a gaseous medium such as circulating air flows. A probe unit is accommodated in the flow tube, the probe unit being assigned a temperature probe having a flow around it, whose measured value is used for correcting a temperature signal detected by ultrasound.

13 Claims, 2 Drawing Sheets

ULTRASONIC MEASURING UNIT HAVING INTEGRATED HUMIDITY ANALYSIS

FIELD OF THE INVENTION

The present invention relates to an ultrasonic measuring unit having integrated humidity analysis, in particular for air mass measurement on internal combustion engines.

BACKGROUND INFORMATION

A method for measuring the temperature of a fluid in a measuring tube is known from DE 44 42078 A1. According to this method, a first ultrasonic signal is emitted into a measuring tube in the direction of flow of the fluid and received, run-time $T_{down}$ of the first ultrasonic signal being measured. Furthermore, a second ultrasonic signal is emitted into the measuring tube against the direction of flow of the fluid and received, run-time $T_{up}$ of the second ultrasonic signal being measured. Flow velocity v of the fluid in the measuring tube is ascertained from both run-times $T_{down}$ and $T_{up}$. Flow velocity v of the fluid is determined from speed of sound $C_0$, and temperature T of the fluid flowing in the measuring tube is concluded from speed of sound C.

A mass flow rate meter is discussed in DE 42 37 907 A1. An ultrasonic flow rate meter for measuring the mass flow rate includes at least two ultrasonic transducers, which are attached to a wall or in the walls of a flow channel. The two ultrasonic transducers are connected to an analysis unit for measuring the volume flow rate. A thermal sensor is provided on or in the walls of the flow channel, which is used for measuring the temperature. For analyzing the measurement results, the meter is connected to the same or a further analysis unit, this analysis unit determining the density of the material in the flow channel at least in principle. The analysis units are implemented in such a way that the thermal sensor allows at least approximate measurement of the mass flow rate as an auxiliary if the ultrasonic transducer fails.

The thermal sensor may be implemented as a group of hot wires, as a hot film, as an NTC resistor, as a PTC resistor, or also as a micromechanical thermal sensor.

The DE 42 37 907 A1 document has the disadvantage that, if the ultrasonic transducer fails, only an at least approximate measurement of the mass flow rate is performed via the thermal sensor, which results in imprecise results for exactly determining the charge of combustion air in the combustion chambers of an internal combustion engine. To allow optimum combustion, extremely precise information about the air quantity contained in the combustion chambers of the internal combustion engine is necessary to inject a fuel quantity tailored thereto, which is ideally in stoichiometric ratio to the air quantity present in the combustion chamber.

Furthermore, ultrasonic measuring units are known from the related art, in which two diametrically opposed ultrasonic transducers are provided in a measuring tube in which a gaseous medium flows. These alternately or simultaneously transmit ultrasonic signals. The resulting run-times of ultrasonic signals $t_1$ and $t_2$ are measured in the flow direction of the gaseous fluid and opposite to the flow direction of the gaseous fluid to measure the flow rate of the flowing medium.

SUMMARY OF THE INVENTION

The approach proposed according to the exemplary embodiments and/or exemplary methods of the present invention allows extremely precise detection of the air quantity flowing into the intake system of motor vehicle internal combustion engines, so that precise engine control, i.e., very precise metering of fuel to the combustion chambers of the multicylinder internal combustion engine, may be performed. It is thus ensured that the currently applicable emission standards and the stricter emission standards to be expected in the future may be maintained.

According to the exemplary embodiments and/or exemplary methods of the present invention, a probe is proposed which includes an ultrasonic flow sensor, which is introduced into a flow tube in the intake system of the internal combustion engine to form a seal. The probe includes at least two ultrasonic transducers integrated therein and a temperature sensor, analysis electronics for analyzing the ultrasonic signals, and a reflection surface. The temperature sensor may be fixed either on the reflection surface or on an associated holder.

Using the probe, the mass flow rate of a medium flowing in a line, such as air, is determined, a volume flow signal representing the volume flow of the medium and an ultrasonic temperature signal representing the temperature of the flowing medium being ascertained using an ultrasonic unit. Furthermore, a pressure signal representing the pressure of the flowing medium is produced using a pressure detection unit and the mass flow rate is calculated from the volume flow signal, the ultrasonic temperature signal, and the pressure signal. Independently of this, a temperature value characterizing the medium temperature of the flowing medium is ascertained using a temperature probe, which may be implemented as an NTC element, for example, and this value ascertained using the temperature probe is used for correcting the calculated mass flow rate and/or for correcting the ultrasonic temperature signal.

Furthermore, the temperature value of the flowing medium determined using the temperature probe may be used for ascertaining a value representing the moisture content of the flowing medium.

The advantages of two different temperature measuring methods may advantageously be unified by the method described above. These advantages are that, on the one hand, the humidity independence of the otherwise slow temperature probe, which is implemented as an NTC element, for example, may be combined with the rapidity and freedom from contact of an ultrasonic temperature signal, which is otherwise dependent on the humidity. Unifying the cited advantages within a single probe and/or sensor and/or the analysis downstream therefrom results in significantly more precise mass flow and temperature signals than in the related art and in an additional humidity signal which may be processed inside the engine control unit.

The general advantage of the use of the ultrasonic flow measurement may primarily be seen in the fact that this technology only has a slight drift in the event of contamination, i.e., the ultrasonic signals are only influenced slightly in regard to their plausibility and true validity by contaminants in comparison with other measurement technologies. In addition to the flow rate of the gaseous medium in the flow tube, its speed of sound may also be detected by an ultrasonic run-time measurement. The speed of sound of the gaseous medium is essentially a function of the temperature and the atmospheric humidity. Detecting the speed of sound thus allows a very rapid conclusion regarding the temperature and/or the atmospheric humidity. In contrast to a measurement using a temperature probe, an ultrasonic temperature measurement is completely decoupled from the temperature of the tube wall of the flow tube.

The exemplary embodiments and/or exemplary methods of the present invention is described in greater detail in the following on the basis of the drawings.

DETAILED DESCRIPTION

Figure 1:
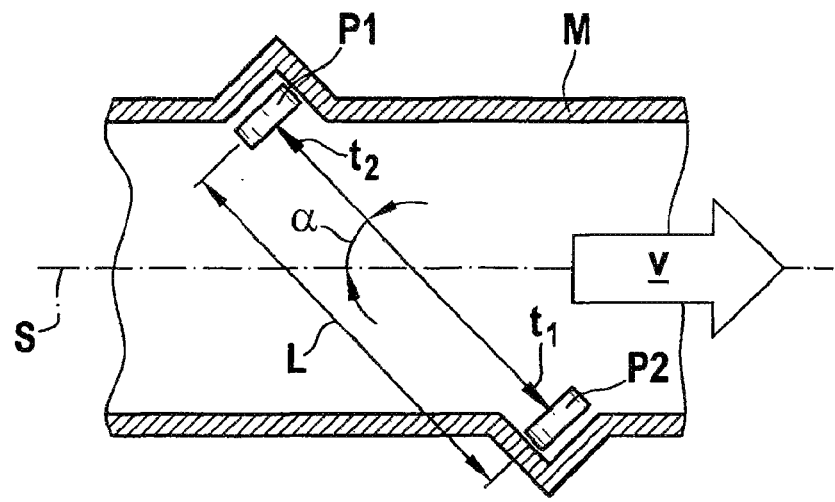
FIG. 1 shows an ultrasonic flow rate meter known from the related art having diametrically opposed ultrasonic transducers.

An ultrasonic flow rate measuring unit from the related art is shown in the illustration in FIG. 1. A first ultrasonic transducer P1 and a second ultrasonic transducer P2 are accommodated diametrically opposite one another in a flow tube M. For this purpose, openings are provided in flow tube M, into which first ultrasonic transducer P1 and second ultrasonic transducer P2 are introduced. According to the illustration in FIG. 1, the distance between first ultrasonic transducer P1 and second ultrasonic transducer P2 is identified by L. Both first ultrasonic transducer P1 and also second ultrasonic transducer P2 are situated tilted by angle α to axis of symmetry S of flow tube M. Medium v flowing in flow tube M flows in the direction of the arrow drawn in FIG. 1. First ultrasonic transducer P1 and second ultrasonic transducer P2 reciprocally transmit and receive ultrasonic signals. A run-time difference is determined from the run-times obtained for the ultrasonic signals in the flow direction (run-time $t_1$) and against the flow direction of flowing medium v (run-time $t_2$), via which the flow rate of the medium flowing in flow tube M may be concluded in analysis electronics (not shown in FIG. 1).

Figure 2:
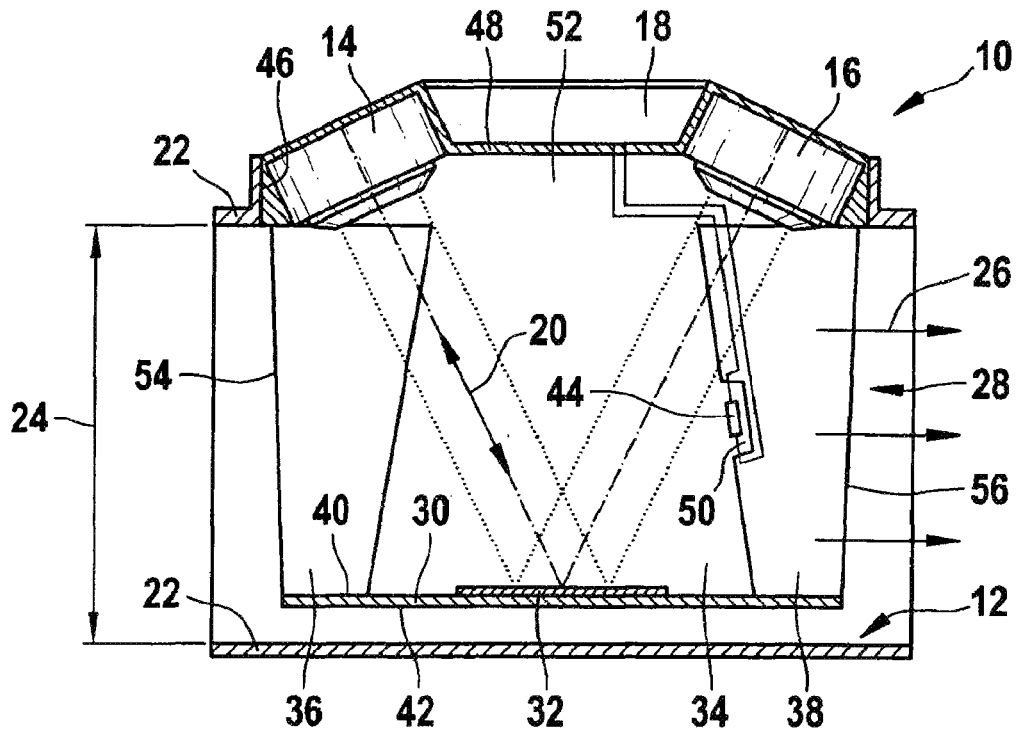
FIG. 2 shows in a side view a section through the probe proposed according to the present invention having a reflector surface and ultrasonic transducers as well as an integrated temperature probe.

The probe proposed according to the present invention is shown in a partially sectional side view in the illustration in FIG. 2.

An ultrasonic flow sensor 10 is introduced into a receptacle opening 46 on the top of a flow tube 12. The ultrasonic flow sensor shown in FIG. 2 includes a first ultrasonic transducer 14 and a second ultrasonic transducer 16. Analysis electronics 18 are located between first ultrasonic transducer 14 and second ultrasonic transducer 16, which are situated on the same side of flow tube 12. When activated appropriately, for example, first ultrasonic transducer 14 emits ultrasonic signals 20 at a reflection surface 30 which are received by second ultrasonic transducer 16. Of course, it is also possible to operate second ultrasonic transducer 16 in transmit mode and first ultrasonic transducer 14 in receive mode. Both ultrasonic transducers 14 and 16 are integral components of a probe unit 48, which is introduced into receptacle opening 46 in tube wall 22 of flow tube 12. Both ultrasonic transducers 14 and 16 are situated inside probe unit 48 inclined by a tilt angle to the surface normal. First ultrasonic transducer 14 and second ultrasonic transducer 16 delimit an opening 52 in the upper area of probe unit 48.

Probe unit 48 shown in FIG. 2 includes a holder 28 in addition to analysis electronics 18, first ultrasonic transducer 14, and second ultrasonic transducer 16. Holder 28 essentially has a first web 36 and a second web 38, which are separated from one another, viewed in flow direction 26 of flowing medium v, by a recess 34. A reflection surface 30 is implemented on holder 28 on the end facing away from first ultrasonic transducer 14 and second ultrasonic transducer 16. The top of reflection surface 30 is identified by reference numeral 40, the bottom of reflection surface 30 is identified by reference numeral 42.

A coating 32 which improves the reflection characteristic of ultrasonic signals 20 may advantageously be glued or attached in another way to top 40 of reflection surface 30. Coating 32, which positively influences the reflection characteristic of ultrasonic signals 20, may also be embedded in top 40 of reflection surface 30 in the form of an insert or an inlay.

A temperature probe 44 is located in the area of recess 34 in second web 38 of holder 28. Temperature probe 44 is accommodated in a recess 50 of second web 38 and is connected to analysis electronics 18 of probe unit 48. Temperature probe 44 is an NTC element.

For the sake of completeness, it is to be noted that the inflow side of holder 28 is identified by reference numeral 54, while the outflow side of holder 28 of probe unit 48 is identified by reference numeral 56.

Furthermore, it may be seen from the illustration of FIG. 2 that first ultrasonic transducer 14, analysis electronics 18, second ultrasonic transducer 16, and holder 28 including reflection surface 30 may be implemented as an integral component which may be plugged into the top of flow tube 12 in receptacle opening 46 provided there. It is essential that temperature probe element 44 introduced into second web 38 of holder 28 is thermally decoupled from tube wall 22 of flow tube 12. The integration of temperature probe 44 into holder 28 of ultrasonic measuring unit 10 suppresses any influence of the temperature of tube wall 22 on the measurement result of temperature probe 44. The flow of a flowing medium flowing in flow tube 12, such as air, passes through entire flow cross section 24 of flow tube 12 and flows around top 40 and bottom 42 of reflection surface 30, which is attached to the lower end of holder 28 and is implemented as essentially flat.

In addition to the one-piece implementation of probe unit 48, it may also be implemented as consisting of multiple parts, i.e., the upper area of probe unit 48 having first ultrasonic transducer 14, second ultrasonic transducer 16, and analysis electronics 18 may be connected at a separate interface to holder 28, which includes first web 36, second web 38, and reflection surface 30.

Using probe unit 48, it is possible to generate an ultrasonic temperature signal and ascertain a value representing the temperature of the flowing medium using a temperature probe 44, which is decoupled from the temperature of tube wall 22 because of its positioning. Humidity-independent temperature probe 44, which operates more slowly, may advantageously be used for correcting the rapid and contactless, but humidity-dependent, ultrasonic temperature signal.

By attaching temperature probe 44 inside holder 28 of reflection surface 30, good flow around temperature probe 44 on both sides and thus significantly better thermal coupling to the flowing medium is made possible. In contrast, the thermal coupling to tube wall 22 of flow tube 12 is significantly reduced, compared to attaching temperature probe 44 in or on tube wall 22 of flow tube 12. Furthermore, no separate additional holder for temperature probe 44 is required in the approach proposed according to the present invention, which would negatively influence the pressure drop at ultrasonic measuring unit 10 overall.

Figure 3:
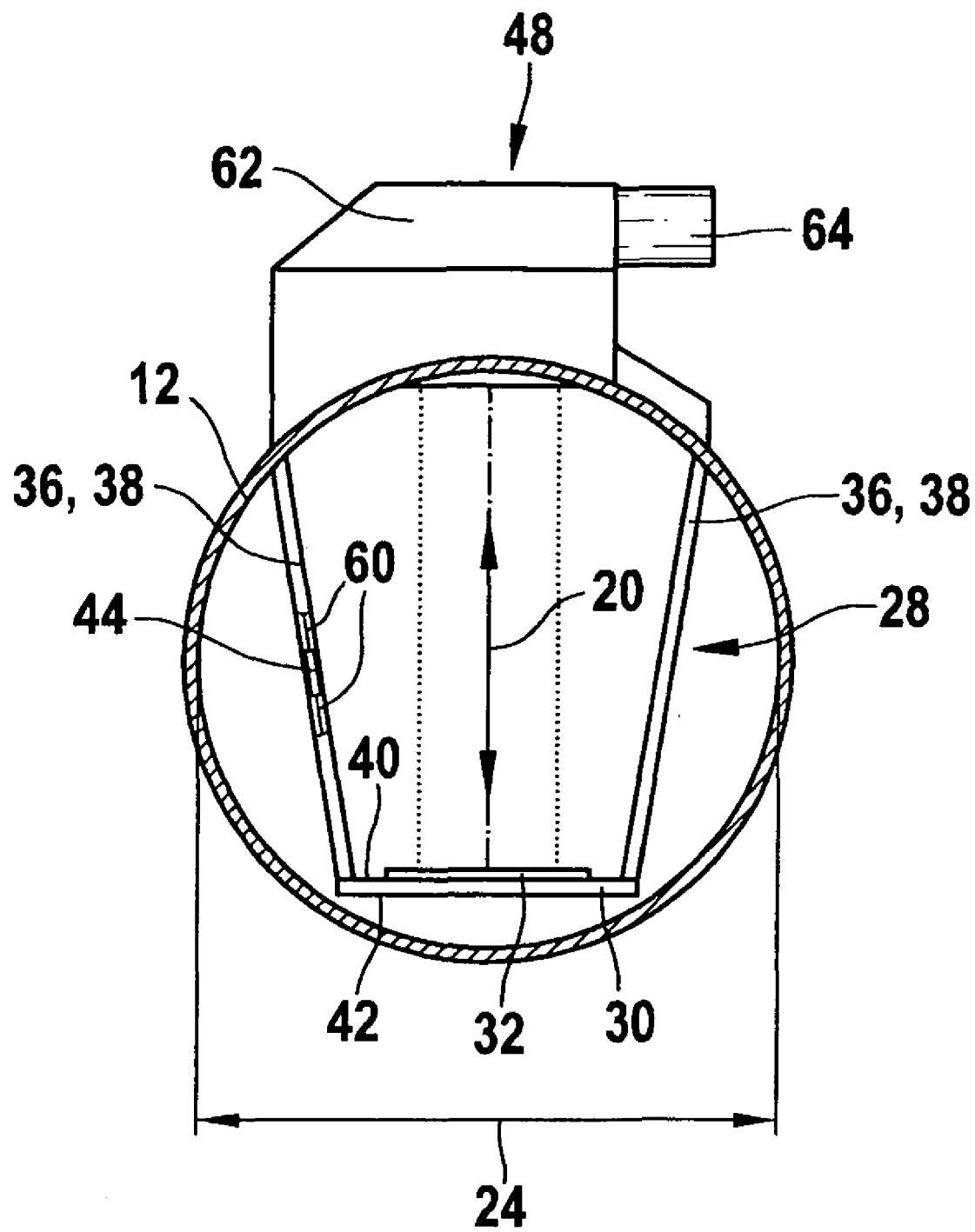
FIG. 3 shows a view of the probe proposed according to the present invention having ultrasonic transducers and an integrated temperature probe from the front side, with a cross section of the flow tube.

A view, which is rotated by 90°, of the probe proposed according to the present invention having ultrasonic transducers is shown in the illustration of FIG. 3.

It may be seen from the illustration in FIG. 3 that holder 28, on whose lower end reflection surface 30 is accommodated, is implemented as essentially U-shaped. Temperature probe 44 is integrated in one of the components of the holder, i.e., first web 36 or second web 38. This probe has the flow of the flowing medium passing through flow cross section 24 of flow tube 12 flowing around it on both sides. Because of the positioning of temperature probe 44 in holder 28, temperature probe 44 is decoupled from tube wall 22 of flow tube 12. The electrical connections, via which temperature probe 44 is connected to analysis electronics 18, are identified by reference numeral 60. In addition, it is shown in FIG. 3 that a coating 32 which improves the reflection of ultrasonic signals 20 is attached to top 40 of reflection surface 30.

The upper part of probe unit 48 may be seen on the top of flow tube 12. First ultrasonic transducer 14 and second ultrasonic transducer 16 as well as analysis electronics 18 are protected from contamination and humidity influences using a cap 62. A terminal plug 64, via which probe unit 48 may be externally supplied with an operating voltage and via which the measurement signals may be transmitted outward, for example, to a central engine control unit of the internal combustion engine, is located on the side of cap 62. The fuel quantity, which is injected into the combustion chamber in accordance with the intended ignition timing (as a function of the firing sequence), and which is tailored to the charge ratio of the individual cylinders of the multicylinder internal combustion engine, is calculated in the central engine control unit of the internal combustion engine on the basis of the transmitted signals of ultrasonic measuring unit 10.

In the following, the speed of sound is identified by c. Speed of sound c is a function of the composition of the gas, in the case of air of the atmospheric humidity and the temperature in particular, according to the following relation:

$$c = \sqrt{\kappa R T}$$

with gas constant R, adiabatic exponent κ, and temperature T. Adiabatic exponent κ is a function of the molecular degrees of freedom of the flowing medium. The length of the ultrasonic path is identified by L, and the tilt angle of the ultrasonic path in relation to the flow direction by α. The run-times opposite to and in the flow direction of the flowing medium are identified by $t_1$, $t_2$, the pressure by p, and the temperature of temperature probe 44 by $T_{NTC}$. Derived auxiliary variables are, for example, a differential run-time $\Delta t = t_1 - t_2$, summation run-time $\Sigma t = t_1 + t_2$, and a correction factor $s = 1 - (\Delta t/\Sigma t)^2$ (with the assumption of flow rates of approximately 1).

Speed of sound c may be determined directly from the above-mentioned variables as $$c = 2 \ast L \ast (1/\Sigma t) \ast (1/s)$$

and mean flow velocity v as $$v = (2L/\cos \alpha) \ast (\Delta t/(\Sigma t)^2) \ast (1/s).$$

Mass flow signal m may be viewed as approximately proportional to partial flow rate ṅ and the flowing medium. using $$p \ast V = nkT \text{ and}$$

$$v \sim dV/dt \text{ (volume flow)}$$

the partial flow rates ṅ result as:

$$\dot{n} = (dn/dV) \ast (dV/dt) \sim (p/T) \ast v \sim p(v/c^2) \kappa \sim p \ast \Delta t \ast s \ast \kappa$$

In a further approximation, ṅ may be set proportional to $p \ast \Delta t$, an error according to factor $s \ast \kappa$ being tolerated. If the gas composition of the flowing medium only significantly changes due to atmospheric humidity, this error factor is a function of mean flow velocity v, temperature T, and atmospheric humidity $h_{rel}$. The calculation of a mass flow and ultrasonic temperature signal not corrected in regard to the atmospheric humidity may be represented by the relation $$m_{UFM} \sim p \ast \Delta t$$

A possible calculation at greater flow rates, which is still not corrected in regard to the atmospheric humidity, however, includes correction factor s according to the following relation:

$$m_{UFM} \sim p \ast \Delta t \ast s$$

The ultrasonic temperature signal not corrected in regard to the atmospheric humidity is calculated according to the relation $$T_{UFM} \sim c^2$$

For a humidity-corrected calculation, the mass flow signal which is not corrected is to be corrected using factor $\kappa_{humid}/\kappa_{dry}$:

$$m_{corr} = m_{UFM} \ast \text{corr} = m_{UFM} \ast \kappa_{humid}/\kappa_{dry} = m_{UFM} \ast T_{UFM}/T_{NTC}.$$

It is to be noted that temperature probe 44 is thermally connected not only to the flowing medium, such as air, but rather also to tube wall 22 of flow tube 12. In the event of temperature differences between tube wall 22 of flow tube 12 and the flowing medium, the temperature signal of temperature probe 44 becomes more reliable the higher the flow rate of the flowing medium. On the other hand, the absolute atmospheric humidity generally does not change very rapidly, so that the correction factor does not have to be redetermined continuously, but rather only for the case in which temperature signal $T_{NTC}$ of temperature probe 44 is classified as reliable enough. It is to be noted that the potential atmospheric humidity drops with falling temperature, because the air may absorb less water due to the decreasing vapor pressure. Because of the measurement tolerances of temperature probe 44 and the additional measurement errors described above, a humidity correction will not improve the precision of the air flow signal at very low temperatures.

To take these limits into consideration in regard to a practical correction, the correction may always be updated, for example, $$\text{corr} = T_{UFM}/T_{NTC}$$

as soon as the flow rate and/or the mass flow signal exceeds a previously established threshold, such as m=100 kg/h. For example, the correction factor $$\text{corr} = 1$$

may be set below a limit temperature (e.g., T=20° C.) that is to be predetermined and is a function of the particular individual tolerances and the possible environmental conditions.

The ultrasonic temperature signal ascertained using ultrasonic transducers 14 and 16 has the significant advantage of being very rapid and only detecting the flowing medium, such as air. In contrast, the dependence on the atmospheric humidity of the uncorrected ultrasonic temperature signal is disadvantageous. Temperature probe 44 behaves in an opposite way thereto: its temperature signal is sluggish and may be subject to error at low flow rates because of the thermal coupling of temperature probe 44 to tube wall 22 of flow tube 12. On the other hand, humidity influences are negligible.

In particular at temperatures which are not too high, the potential influence of humidity on the temperature signal of temperature probe 44 is so small that its temperature signal does not have to be corrected. At higher temperatures, the water absorption capability of the air increases and thus the potential error to be attributed to the atmospheric humidity. In this case, at least at a sufficient flow rate of the flowing medium, temperature signal $T_{NTC}$ of temperature probe 44 may be seen as reliable.

The humidity-corrected temperature signal then results as $$T_{corr}=T_{UFM}/\text{corr}_T,$$

correction factor $\text{corr}_T$ being updated as described above if a fixed threshold of the mass flow of $\dot{m}=100$ kg/h or in regard to the limiting temperature is exceeded. The positive properties of both measurement principles, i.e., a temperature signal detected by the ultrasonic method and a temperature signal detected by temperature probe 44, are thus combined in a single signal.

The adiabatic exponents of humid and dry air differ in regard to determining the atmospheric humidity according to $$\kappa_{humid}/\kappa_{dry}=\text{corr},$$

corr being set equal to 1 as a function of the flow rate in regard to exceeding a previously fixed mass flow threshold of, for example, $\dot{m}=100$ kg/h or in regard to a limit temperature (e.g., T=20° C.) to be predetermined.

With the assumption that the gas composition essentially only changes in regard to the proportion of water (atmospheric humidity) and all other components are always in the same proportional ratio to one another, the proportion of water may be determined from the ratio of the actual adiabatic exponent to that of dry air. The adiabatic exponent for a gas mixture may be derived as $$\kappa = \gamma/M \text{ with}$$

$$\gamma = 1 + R(X_1 C_{v1} + X_2 C_{v2} + \ldots)^{-1} \text{ and } M = X_1 M_1 + X_2 M_2 + \ldots \text{ with}$$

$$\sum_j X_j = 1,$$

$C_v$ being the specific heat at constant volume and M being the molar mass.

These are known variables and may be inferred from the literature. $X_j$ are the particular molar proportions of the individual mixture components. These proportions are also known from the literature for dry air. Therefore, proportion $X_j$, which describes the proportion of water, i.e., the atmospheric humidity of the flowing medium in the case of air, may be determined directly from the adiabatic exponent for humid air.

In internal combustion engines, the proportion of oxygen in the combustion air is primarily of interest for controlling an optimum combustion. In addition to the humidity correction described above in regard to the total mass flow of the flowing medium, a further correction factor may be determined from the determination of the atmospheric humidity derived above, which takes the driving back of the oxygen proportion by the water, i.e., the proportion of water in the flowing medium, into consideration.

Molar proportions $X_j$ for dry air are assumed to be known, in particular oxygen proportion $X_{O_2}^{dry}$. Furthermore, it may be assumed that the ratios of these proportions to one another also remain constant in humid air. Water proportion $X_{H_2O}$ is known by a atmospheric humidity determination as described above, from which changed oxygen proportion $X_{O_2}^{humid}$ may be determined. The mass flow signal relating to the oxygen proportion results as $$m_{O_2} \sim M_{corr} * X_{O_2}^{humid}/X_{O_2}^{dry}.$$

Temperature probe 44 may be situated on an inflow edge, indicated in FIG. 2 on the inflow edge of second web 38 defined by recess 34 of holder 28. It is thus ensured that temperature probe 44 has the flow to be detected flowing around it on both sides, so that optimum thermal coupling to the flowing medium, such as air, is ensured, while in contrast the thermal coupling to tube wall 22 of flow tube 12 is minimized. The position of temperature probe 44 thus selected ensures significantly more precise temperature measurement of the flowing medium, compared to attaching temperature probe 44 to wall 22 of flow tube 12.

As a variation, it is also conceivable to additionally use a pressure sensor in the area of probe unit 48 or integrate it in probe unit 48. A pressure measured value detected via the pressure sensor or a measured variable combined with the other measured values of the sensor may be transmitted via probe unit 48 to the central engine control unit for further analysis. The density of the medium flowing in flow tube 12 may also be determined in principle inside analysis electronics 18, which are accommodated in the upper area of probe unit 48, protected by cap 62.

Reflection surface 30, which is situated on the bottom of holder 28, may have curves or bulges or other irregularities, in a deviation from the illustration in FIG. 2, to bundle, deflect, or focus ultrasonic signals 20 to be reflected, or otherwise change the wave fronts of ultrasonic signals 20. In particular, holder 28 and/or reflection surface 30 may be shaped in such a way that ultrasonic signals 20 which do not run along the actual measurement path are absorbed or scattered because of the shaping of holder 28 and/or reflection surface 30, to avoid interfering signal echoes or parasitic signal paths. For this purpose, materials may also be used outside the actual reflection area which reflect more poorly the ultrasonic frequencies used because of their surface composition or porosity, for example. Reflection surface 30 may be implemented together with holder 28 in the shape of a trough, for example, both holder 28 and also reflection surface 30 being able to have openings from the interior to the exterior of the trough.

According to the illustration in FIGS. 2 and 3, temperature probe 44 is integrated in holder 28, in particular in a recess 50 on second web 38. Alternatively, it is also conceivable to integrate temperature probe 44 in reflection surface 30, so that it may have the medium flowing in flow tube 12 flowing around it both at top 40 and also at bottom 42 of reflection surface 30.

What is claimed is:

1. A method for determining a mass flow rate of a medium flowing in a flow tube, the method comprising:
   a) ascertaining a pressure signal representing a pressure of the flowing medium using a pressure detection unit;
   b) ascertaining ultrasound signal running times opposite to and in a flow direction of the flowing medium, and ascertaining an ultrasonic temperature signal representing a temperature of the flowing medium, using an ultrasonic unit;
   c) ascertaining a temperature value representing the temperature of the flowing medium using a temperature probe;
   d) calculating the mass flow rate as a function of the ultrasound signal running times and the pressure signal; and
   e) correcting the calculated mass flow rate as a function of the ultrasonic temperature signal and the temperature value.

2. The method of claim 1, wherein the temperature value of the flowing medium determined using the temperature probe is used for ascertaining a value representing a humidity of the flowing medium.

3. The method of claim 1, wherein the temperature value of the flowing medium determined using the temperature probe is additionally used for correction of the ultrasonic temperature signal.

4. The method of claim 1, wherein a speed of sound of the flowing medium is determined according to the relation $c=2*L*(1/\Sigma t)*(1/s)$, where L=distance of the ultrasonic transducers from one another, and a mean flow velocity is determined according to $$v=(2L/\cos\alpha)*(\Delta t/(\Sigma t)^2)*(1/s),$$

where $\alpha$=tilt angle of the ultrasonic transducers.

5. The method of claim 4, wherein the temperature T of the flowing medium is determined from the ascertained speed of sound c of the flowing medium according to $c^2=\kappa RT$, where $\kappa$=adiabatic coefficient and R=gas constant.

6. The method of claim 1, wherein a correction is performed in regard to an atmospheric humidity of a mass flow signal of the flowing medium based on a correction factor $m_{corr}=m_{UFM}*\text{corr}=m_{UFM}*\kappa_{humid}/\kappa_{dry}=m_{UFM}*T_{UFM}/T_{NTC}$, where $\kappa_{humid}$=adiabatic exponent of humid air, $\kappa_{dry}$=adiabatic exponent of dry air, $T_{UFM}$=ultrasonic temperature signal, $T_{NTC}$=temperature value of temperature probe.

7. The method of claim 6, wherein an update of the correction factor $\text{corr}=T_{UFM}/T_{NTC}$ is performed either as soon as the mass flow signal falls below a previously established threshold or when the temperature falls below a temperature of T=20° C.

8. The method of claim 1, wherein the adiabatic exponent $\kappa_{humid}$ for humid air is determined according to the relation $\kappa=\gamma/m$, where:

$$\gamma=1+R(X_1C_{v1}+X_2C_{v2}+\ldots)^{-1}, \text{ and}$$

$$M=X_1M_1+X_2M_2+\ldots, \text{ where}$$

$$\sum_j X_j = 1,$$

$C_v$=the specific heat at constant volume, M=molar mass, $X_j$=molar proportions of the individual mixture components.

9. The method of claim 1, wherein the mass flow signal in relation to the oxygen proportion is calculated based on the relation of:

$$m_{O_2} \sim m_{corr} * X_{O_2}^{humid}/X_{O_2}^{dry}, \text{ where}$$

$X_{O_2}^{humid}$=oxygen proportion of humid air, $X_{O_2}^{dry}$=oxygen proportion of dry air.

10. An ultrasonic measuring unit, comprising:
two ultrasonic transducers for coupling ultrasonic signals into a flowing medium, wherein a probe unit is accommodated in a flow tube, which includes a temperature probe having a flow around it, which is held decoupled from the flow tube; and
an analysis electronics arrangement for determining a mass flow rate of the medium flowing in the flow tube by performing the following:
  a) ascertaining a pressure signal representing a pressure of the flowing medium using a pressure detection unit;
  b) ascertaining ultrasound signal running times opposite to and in a flow direction of the flowing medium, and ascertaining an ultrasonic temperature signal representing a temperature of the flowing medium, using an ultrasonic unit;
  c) ascertaining a temperature value representing the temperature of the flowing medium using a temperature probe;
  d) calculating the mass flow rate as a function of the ultrasound signal running times and the pressure signal; and
  e) correcting the calculated mass flow rate as a function of the ultrasonic temperature signal and the temperature value.

11. The ultrasonic measuring unit of claim 10, wherein the probe unit includes a holder to which a reflection surface having a free flow around it is attached.

12. The ultrasonic measuring unit of claim 11, wherein the reflection surface is implemented as one of flat, vaulted, and curved, and the temperature probe is integrated therein.

13. The ultrasonic measuring unit of claim 10, wherein the temperature probe is implemented as one of an NTC, a PTC, a hot wire sensor, and a hot film sensor.

* * * * *